UNITED STATES PATENT OFFICE.

PAUL R. HERSHMAN, OF CHICAGO, ILLINOIS.

PROCESS OF PRODUCING ALUMINATE FROM ALUNITE.

1,191,105.

Specification of Letters Patent. Patented July 11, 1916.

No Drawing. Application filed January 18, 1916. Serial No. 72,690.

*To all whom it may concern:*

Be it known that I, PAUL R. HERSHMAN, a citizen of the Empire of Austria-Hungary, residing at Chicago, county of Cook, State of Illinois, have invented certain new and useful Improvements in Processes of Producing Aluminate from Alunite; and I do hereby declare the following to be a full, clear, and exact description of the invention, such as will enable others skilled in the art to which it appertains to make and use the same.

My invention relates to the treatment of alunite and to the recovery therefrom of potassium aluminate, and alumina, in an alkali-soluble form.

In the manufacture of potassium compounds and alumina from alunite, as heretofore practised, the alunite is calcined at temperatures of about 700°–1200°C. Potassium sulfate and alumina are formed; and the product is then extracted with water, leaving the alumina as residue, together with the impurities originally contained in the alunite, such as iron and silica. If the calcination is carried out in an oxidizing atmosphere, merely traces of aluminate are formed. Also, the bulk of the alumina which has not been converted into these traces of aluminate becomes, with increasing temperature and increasing time of heating, more and more insoluble in alkali lyes. A product obtained in this way can therefore not be converted into purified alumina by the well-known treatment with alkali solution and subsequent re-precipitation, and is therefore not suitable for the production of aluminum metal or aluminum salts; the impurities of the residual oxid left after the extraction of the potassium sulfate with water consisting mostly of silica, iron, and phosphoric acid, frequently present in large proportions. On the other hand, when alunite,—the results given below have been principally obtained by the use of basic alunite such as is found in large deposits in Utah—is heated, without preceding calcination, with a solution of sodium hydroxid, the alumina contained dissolves almost entirely in the latter. The use of this method for purification of the alumina would, of course, mean a large waste of alkali, which is consumed in the neutralization of the sulfuric acid contained in the raw alunite. I have discovered, now, that the alumina of the calcined alunite also becomes alkali-soluble when the calcination is carried out in a reducing atmosphere, and particularly in the presence of steam. Furthermore, under these conditions part of the alumina combines with the potassium oxid contained as sulfate in the raw alunite, and forms water-soluble potassium aluminate; the proportion in which the two combine being one molecule of alumina to one molecule of potassium oxid.

The preferred method of working is the following: Crude basic alunite is heated in a closed vessel, having only side openings for entrance and exit of the gases used, in a current of generator gas and steam, and a temperature of about 800°C. is maintained for three hours. The product obtained is treated, preferably under pressure of 150 to 175 pounds per square inch, with hot water of a corresponding temperature, although the use of pressure is not absolutely essential. About 15% of the total alumina contained is thus brought into solution in the form of potassium aluminate. The residue after being well washed with water is free of potassium aluminate and soluble or insoluble potassium salts, and consists of alkali-soluble alumina and all the impurities. The residual alumina is then dissolved and re-precipitated by any of the well-known methods, while the alumina contained in the above-obtained solution of potassium aluminate is recovered by the "Bayer" method, or precipitated with carbonic acid and potassium hydroxid or carbonate obtained as by-product. It is also possible to convert the entire alumina contained in raw alunite directly into water-soluble potassium aluminate by adding as fluxes to the raw alunite the necessary amount of caustic alkali or alkali carbonate to combine with the excess of alumina, *i. e.*, the alumina which is not combined with the potassium oxid from the potassium sulfate in the alunite. In case of using potassium salts—which of course would generally be used, to avoid contamination with sodium salts—the proper amount would be that of one molecule of potassium oxid for every molecule of aluminum oxid above one amount of potassium oxid contained in the alunite.

It is clear that many changes of minor importance would suggest themselves to those skilled in chemistry, without deviating from the spirit of my invention. For instance, instead of leaching out the water-soluble potassium aluminate, and treating the residue with an alkali solution, the calcined mass may be directly treated with the necessary solution of alkali, without preliminary leaching out of the water-soluble constituents.

What I claim is:

1. A method of producing potassium aluminate from alunite, which comprises calcining the alunite under reducing conditions, and subsequently extracting the mass by water; substantially as described.

2. A method of producing potassium aluminate from alunite, which comprises calcining the alunite under reducing conditions, and subsequently extracting the mass by water, under pressure; substantially as described.

3. A method of producing potassium aluminate from alunite, which comprises calcining the alunite under reducing conditions with the aid of steam, and subsequently extracting the mass by water; substantially as described.

4. A method of producing potassium aluminate from alunite, which comprises calcining the alunite under reducing conditions with the aid of fluxes capable of being reduced to oxid and combining with alumina, and subsequently extracting the mass by water; substantially as described.

5. The method of recovering in alkali-soluble form the alumina contained in alunite, which comprises calcining the alunite under reducing conditions, and subsequently extracting with water having caustic alkali in solution; substantially as described.

6. The method of recovering potassium aluminate from alunite, which comprises calcining the alunite together with alkali, under reducing conditions, and subsequently extracting the mass by water; substantially as described.

7. The method of recovering potassium aluminate from alunite, which comprises calcining the alunite together with alkali, under reducing conditions, and subsequently extracting the mass by water under pressure; substantially as described.

8. The method of producing potassium aluminate from alunite, which comprises calcining the alunite under reducing conditions; substantially as described.

In testimony whereof I affix my signature.

PAUL R. HERSHMAN.